Jan. 5, 1932.  G. A. REYNOLDS  1,839,592

ROTARY ENGINE CONSTRUCTION

Filed May 26, 1930

Inventor:
George A. Reynolds
Attorney.

Patented Jan. 5, 1932

1,839,592

UNITED STATES PATENT OFFICE

GEORGE A. REYNOLDS, OF LOS ANGELES, CALIFORNIA

ROTARY ENGINE CONSTRUCTION

Application filed May 26, 1930. Serial No. 455,549.

This invention relates to rotary internal combustion engines of the type in which a plurality of horizontally disposed cylinders rotate about a common axis, and is an improvement over my prior United States Patent No. 1,345,808, issued July 6, 1920, entitled "Rotary gas engine constructions".

Considerable difficulty has been experienced in lubricating the cylinder walls of engines of the above stated character due to centrifugal force throwing the lubricant to one side of the cylinders.

The object of the present invention is to provide a lubricating system for engines of the character described which is adapted to discharge a quantity of lubricant upon the cylindrical walls in such a manner that it will be evenly distributed thereover during operation of the engine.

Figure 1:
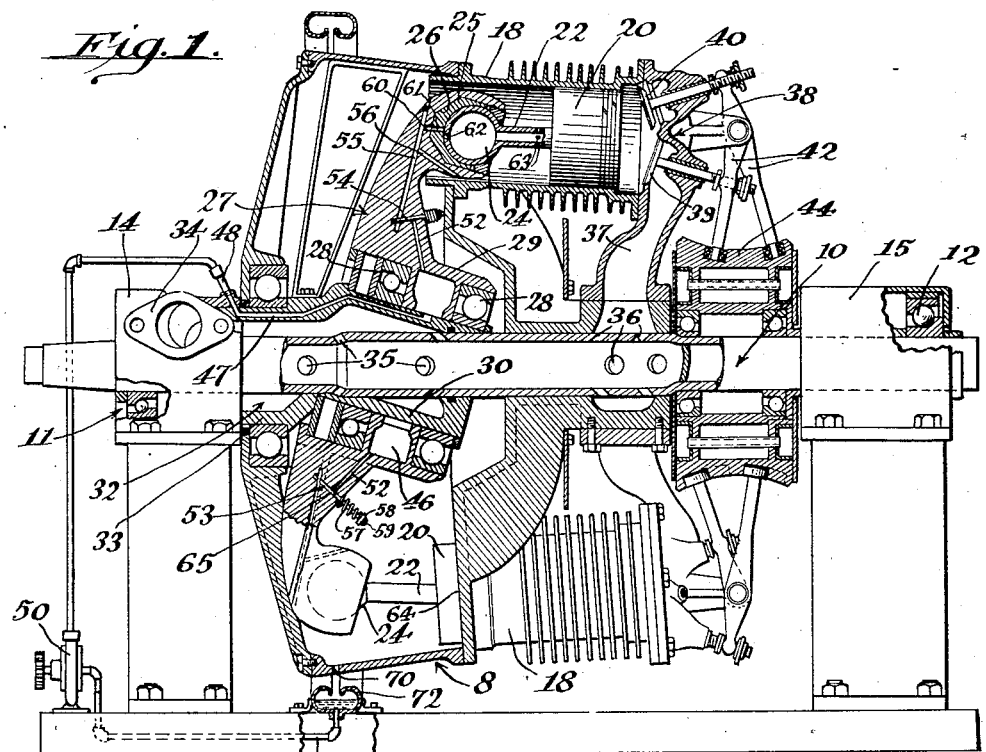
Figure 2:
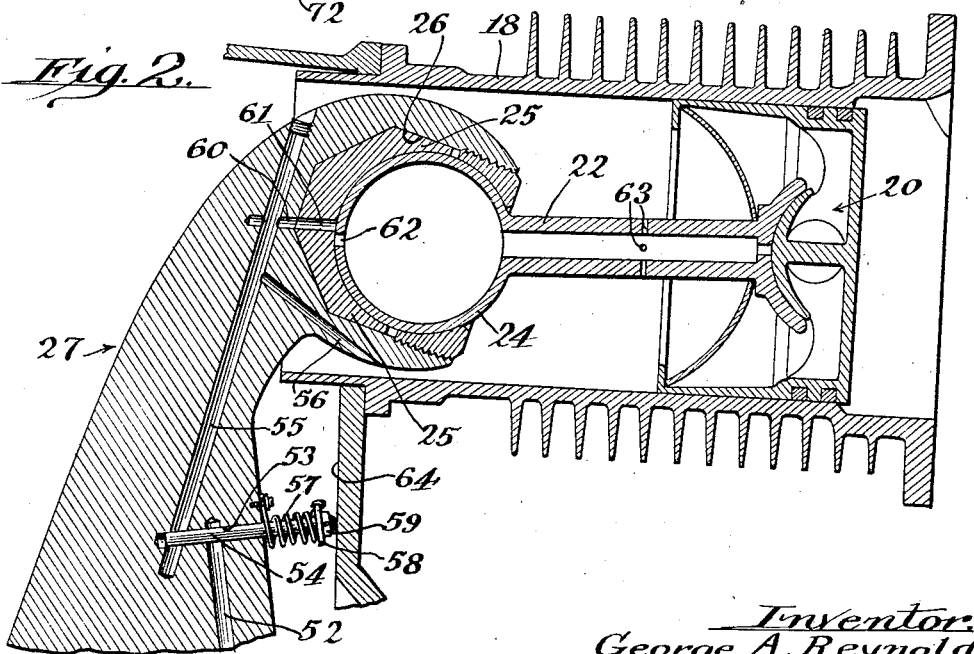

Other objects and advantages will be apparent from the following description, reference being had to the accompanying drawings, in which:

Fig. 1 is a longitudinal sectional view taken through an engine showing the improved lubricating system;

Fig. 2 is an enlarged sectional view taken through one of the cylinders and a portion of the spider showing more in detail operating parts of the improved lubricating system In the accompanying drawings the engine is of exactly the same construction as illustrated in my prior patent above mentioned and will therefore be described briefly Referring by numerals to the drawings, 8 indicates the frame of the motor which is mounted on and secured to a hollow shaft 10 rotatably mounted in antifriction bearings 11 and 12 disposed in suitable housings 14 and 15 respectively A plurality of cylinders 18 are secured to the housing and are provided with pistons 20 and rods 22, the outer ends of which are provided with hollow balls 24 engaging bearings 25 disposed in sockets 26 formed in a spider 27

Spider 27 is rotatably mounted on antifriction bearings 28 positioned in a hub 29 formed thereon, the inner races or cones of which encircle the offset or diagonally disposed portion 30 of a member 32, said member having a portion 33 concentric with the shaft 10 and extending into the bearing housing 14 wherein it is held against rotation by any suitable means, not shown.

Fuel is admitted to the engine through a suitable fitting 34 which communicates with the interior of the member 32 from where it enters the interior of the shaft through ports 35, thence through ports 36 into conduits 37 to a valve housing 38 having seats formed therein engaged by the intake and exhaust valves 39 and 40 respectively, the intake and exhaust valves having stems actuated by rocker arms 42, the inner ends of which enter grooves formed in a cam 44.

The novel feature of this invention resides in the improved lubricating system arranged as follows:

Lubricating oil is fed into an annular recess 46 formed in the hub 29 through a duct or passageway 47 formed in the member 32, the lubricant being introduced into the duct through a pipe 48 leading from a circulating pump designated at 50.

Lubricant in the recess 46 is conveyed to the cylinder walls and balls formed on the piston rods through a plurality of ducts formed in the arms of the spider as follows: Ducts 52 communicate with the recess and cross ducts 53 disposed at substantially right angles thereto in which are mounted plungers 54.

Plungers 54 serve to force the oil through ducts 55 and 56 in a manner hereinafter described, said plungers being urged outwardly by expansion coil springs 57, the inner ends of which are secured to walls of the spider arms, and the outer ends thereof to washers 58 engaged by set collars or the like 59.

The ducts 55 communicate with ducts 60 which are in alignment with ducts 61 formed in the bearings 25, the latter ducts being brought into and out of register with ports 62 formed in the balls 24 and a plurality of apertures 63 are formed in the tubular piston rods through which lubricant will be discharged onto the piston walls.

Due to the spider rotating about an oblique axis, it will be seen that each of the plungers 54 will be reciprocated in the ducts 53 by their engagement with inner walls 64 of the housing during each revolution. When out of engagement as indicated at 65 in Fig. 1, lubricant will enter the ducts 52 and 53 from the recess 46, thence into the ball and piston rod from where it is distributed onto the cylinder walls through the apertures 62, it being understood that the ducts 60 and 61 are then in alignment.

When the plunger is moved inwardly by engagement with the wall 64 as shown in Fig. 2, the oil entrapped in the duct 53 in front of the plunger will be transferred into the duct 55 at which time an equal amount will be discharged from the duct 56 onto the inner side of the cylinder walls, the ducts 60 and 61 then being out of register.

From the foregoing it will be seen that the lubricant is equally distributed over the cylinder walls. By setting the cylinder in a slightly angular position the excess lubricant will be carried outwardly therefrom into the housing. A plurality of apertures 70 are formed in the housing through which the lubricant is discharged by centrifugal force into an annular trough 72 wherein it collects and is conveyed through a conduit 74 to the circulating pump 50.

I claim:

1. In a rotary gas engine including a shaft, a frame secured to said shaft, a plurality of cylinders carried by said frame rotatable about the axis of said shaft, a piston in each cylinder, a spider rotatable on an axis at an angle to the shaft, rods carried by said pistons and having balls formed on the outer ends engaging sockets formed in said spider, each arm of said spider having a radially disposed duct formed therein communicating with an annular recess formed in the center of the spider, a second duct in offset relation to the first duct communicating with the exterior and disposed in such a position that lubricant discharged therefrom will impinge upon the inner portion of the cylinder walls, and a third duct crossing said first and second ducts, plungers mounted in said third ducts with portions thereof projecting therefrom, and springs engaging said plungers, said springs normally urging said plungers outwardly so that lubricant introduced into the annular recess may pass therefrom through each of the ducts formed in the spider, said plungers being moved inwardly during each revolution of the spider by engagement of their end faces with the wall of said frame, inward movement of the plungers closing the first ducts and cutting off passage of the lubricant from the recess therethrough then expelling a portion of the lubricant in the second ducts against the cylinder walls.

2. In a rotary gas engine including a shaft, a frame secured to said shaft, a plurality of cylinders carried by said frame rotatable about the axis of said shaft, a spider rotatable on an axis at an angle to the shaft, said spider having a pair of radially disposed ducts formed therein in offset relation, one of said ducts communicating with an annular recess formed in the center of the spider, the other of said ducts terminating in the outer ends of the arms and disposed therein in such a position that lubricant discharged therefrom will impinge upon the inner portion of the cylinder walls, a plunger mounted in a duct crossing said pair of ducts and a spring engaging said plunger, said spring urging said plunger outwardly so that lubricant in the annular recess may pass therefrom through said ducts, said plunger being moved inwardly during a partial revolution of the spider by engagement with the casing wall, inward movement of the plunger first closing the duct leading from the recess, then displacing a portion of the lubricant in the other ducts so that it will be discharged therefrom against the cylinder walls.

In testimony whereof I affix my signature.

GEORGE A. REYNOLDS.